(12) United States Patent
Reimer et al.

(10) Patent No.: US 7,584,196 B2
(45) Date of Patent: Sep. 1, 2009

(54) SYSTEMS AND METHODS FOR REMOTE STORAGE OF ELECTRONIC DATA

(75) Inventors: Clay Andre Reimer, Greensboro, NC (US); Robert Jefferson Pennington, Snow Camp, NC (US)

(73) Assignee: Live Cargo, Inc., Greensboro, NC (US)

( * ) Notice: Subject to any disclaimer, the term of this patent is extended or adjusted under 35 U.S.C. 154(b) by 0 days.

(21) Appl. No.: 11/526,532

(22) Filed: Sep. 25, 2006

(65) Prior Publication Data

US 2007/0073731 A1 Mar. 29, 2007

Related U.S. Application Data

(60) Provisional application No. 60/719,869, filed on Sep. 23, 2005.

(51) Int. Cl.
*G06F 7/00* (2006.01)
*G06F 17/30* (2006.01)
(52) U.S. Cl. .................... 707/10; 707/101; 709/219
(58) Field of Classification Search ............. 707/1–10, 707/100–104.1, 200–206; 709/203, 214, 709/217–219
See application file for complete search history.

(56) References Cited

U.S. PATENT DOCUMENTS

| | | | | |
|---|---|---|---|---|
| 6,714,968 | B1 * | 3/2004 | Prust | 709/219 |
| 6,735,623 | B1 * | 5/2004 | Prust | 709/219 |
| 2005/0091222 | A1 * | 4/2005 | Serlet et al. | 707/10 |

OTHER PUBLICATIONS

O'Connell et al., JFS: a secure distributed file system for network computers, Sep. 8-10, 1999, IEEE, vol. 2, 450-457.*
Yan et al., A powerful wide-area information client, Mar. 5-9, 1995, IEEE, 13-18.*
Patent Cooperation Treaty, International Search report, Application No. PCT/US06/36991, mailed Sep. 13, 2007, 4 pages.

* cited by examiner

*Primary Examiner*—Jean B Fleurantin
(74) *Attorney, Agent, or Firm*—Kilpatrick Stockton LLP (57) ABSTRACT

Systems and methods for remote storage of electronic data are described. One aspect of one described method includes receiving a signal from a client processor, the signal includes information relating to a file and an action. The method also includes accessing a record in a database based at least in part on the information relating to a file, and determining whether to manipulate the record or the file stored on a separate processor based at least in part on the action, and updating the record or the file based at least in part on the information.

15 Claims, 5 Drawing Sheets

Figure 5

SYSTEMS AND METHODS FOR REMOTE STORAGE OF ELECTRONIC DATA

RELATED APPLICATIONS

This application claims priority to provisional U.S. patent application, Ser. No. 60/719,869, filed on Sep. 23, 2005, titled "Method for Remote Storage of Electronic Data," the entirety of which is incorporated herein by reference.

FIELD OF THE INVENTION

The present invention relates generally to computer networking and, more particularly to systems and methods for remote storage of electronic data.

BACKGROUND OF THE INVENTION

The need for storing electronic media in the form of documents, files, programs, video files, audio files, and other media for the purpose of backup, remote access, sharing and collaboration is increasing in demand by individuals and businesses as their use of and dependence on electronic data increases. Typically the methods used for storing information remotely employ a combination of the operating system's file system and an application to manage the flow and load balancing of files being stored. In some cases, standard extensions that manage files across operating systems are used, but are very restrictive in their ability to further manage the files once they are stored. Therefore, requiring the use of databases and special applications to compensate for the lack of capability.

One of the more common methods for managing files on a remote server is called WebDAV. WebDAV stands for "Web-based Distributed Authoring and Versioning". It is a set of extensions to the HTTP protocol which allows users to collaboratively edit and manage files on remote web servers. While this method does provide storage of files across different OS platforms, it is limited in its ability to do things like manipulate, synchronize, version, share or collaborate these files once they are transferred and stored. WebDAV is also not distributive—meaning that data stored using WebDAV on one server has no relationship to data stored on another server. Other storage methods are provided by the file management systems as an inherent capability of the specific operating system. Some of these include FAT, NTFS, Apple Extended File System, and the Unix File System. While these methods of electronic file management may be used in a remote storage environment, they are strictly limited to storage with other computers on the same operating systems.

SUMMARY OF THE INVENTION

Embodiments of the present invention provide systems and methods for remote storage of electronic data.

One embodiment of the present invention comprises a system of a client, a web services device, a database, and a listener device, each connected to a network. A client may want to store files remotely. To store files remotely, the client may communicate with the web services device, which may be a computer server connected to a database. The database may maintain information related to the files remotely stored on the listener device. The listener device may be a computer server with a storage device.

Because the database maintains information related to the remotely stored files, clients can quickly and easily perform various actions on files and directories, such as copying and sharing them. These and various other file actions may be performed on the database without accessing the files on the listener, which is faster for the client. Since clients may not know how their files are stored remotely, the system is more secure and less dependent on individual operating systems. Also, since files may be remotely stored in a central location, collaboration between different clients on the same files is easier.

An additional feature of an embodiment of the present invention is that the size and amount of data relating to a file may be reduced. The use of a database comprising information relating to a file simplifies and expedites communications relating to the file over low and high bandwidth telecommunication protocols. As a result, an embodiment of the present invention provides advantages to users of mobile phones, personal digital assistants and/or laptop computers with lower telecommunication data transfer rates by allowing such users quicker access to file information.

One aspect of one embodiment of the present invention comprises a method for receiving a signal from a client, the signal comprising information relating to at least one file and at least one action. The embodiment further comprises accessing a record in a database based at least in part on the information, and then determining whether to manipulate the record or to manipulate a file stored on at least one separate processor based on the action. Next, the embodiment comprises updating the record or the at least one file based on the at least one action. In another embodiment, a computer-readable medium (such as, for example random access memory or a computer disk) comprises code for carrying out such a method.

This illustrative embodiment is mentioned not to limit or define the invention, but to provide one example to aid understanding thereof. Illustrative embodiments are discussed in the Detailed Description, and further description of the invention is provided there. Advantages offered by the various embodiments of the present invention may be further understood by examining this specification.

FIGURES

These and other features, aspects, and advantages of the present invention are better understood when the following Detailed Description is read with reference to the accompanying drawings, wherein.

DETAILED DESCRIPTION

Embodiments of the present invention provide systems and methods for remote storage of electronic data. There are multiple embodiments of the present invention, some of which are described herein. By way of introduction and example, one illustrative embodiment of the present invention provides a method for a client device to remotely store a file on a listener device.

In one embodiment, a user operating a client device wants to remotely store a file on a listener device. The file may be, for example, a spreadsheet file stored on a client device's hard drive. The user may indicate it wants to store this file remotely by dragging a file from a client device's desktop into a remote storage application.

Next, the remote storage application on the client device sends a request to a web services device, indicating that the user wants to remotely store a file on a listener device. The request may comprise a signal, which may include information gathered by the client device about the file, such as the file name, file location on the client device, and file size.

The web services device analyzes the user's request, and determines that the action is acceptable. For instance, the web services device may determine whether the user on the client device sending the request has the right account privileges to store files remotely.

The web services device then creates a partial record in a database for the file. The partial identifier may include information such as the file name and the file size. The partial record is incomplete, since some information about the file does not exist, such as how it is encrypted.

The web services device receives an identifier generated by the database, and sends the identifier to the client device.

The client device then packages the file the user wants to remotely store on the listener device. Packaging the file made comprise compressing and encrypting the file. Once the client device has packaged the file to remotely store, the client device sends the web services device a signal. The signal may include information about the packaged file, such as its packaged size, and a notification that the file is ready to be remotely stored on the listener device.

The client device then sends a signal to the web services device that the remote transfer is beginning, and the client device begins to transfer the packaged file to the listener device. Once the remote transfer is complete, the client device signals the web services device that the file is on the listener device and the file is available.

In some embodiments, the user will perform certain actions on a file or a directory in the client application, which only causes a database record of the file to be updated, while the file itself remains in storage on the listener device without being accessed. Examples of such actions include renaming a file, sharing a file, duplicating a file, or deleting a file. Such embodiments tend to speed up such actions for the client device, since the database is accessed and not the listener device. In some embodiments, since the file remotely stored on the listener device is not accessed by such user actions, the file's location on the listener device remains static, in the same location on the storage device.

By utilizing a database to store information about user files, embodiments of the present invention provide a faster, more secure approach to remote storage. Such embodiments tend to allow users to make many file operations, such as renaming, sharing, duplicating and deleting and sharing more efficiently.

The remote storage system described herein is independent of the client device's operating system, giving enterprises more flexibility to utilize remote storage across different platforms. Also, the remote storage system described herein may be utilized across various enterprises, with users located around the world.

This introduction is given to introduce the reader to the general subject matter of the application. By no means is the invention limited to such subject matter. Illustrative embodiments are described below.

System Architecture

Figure 1:
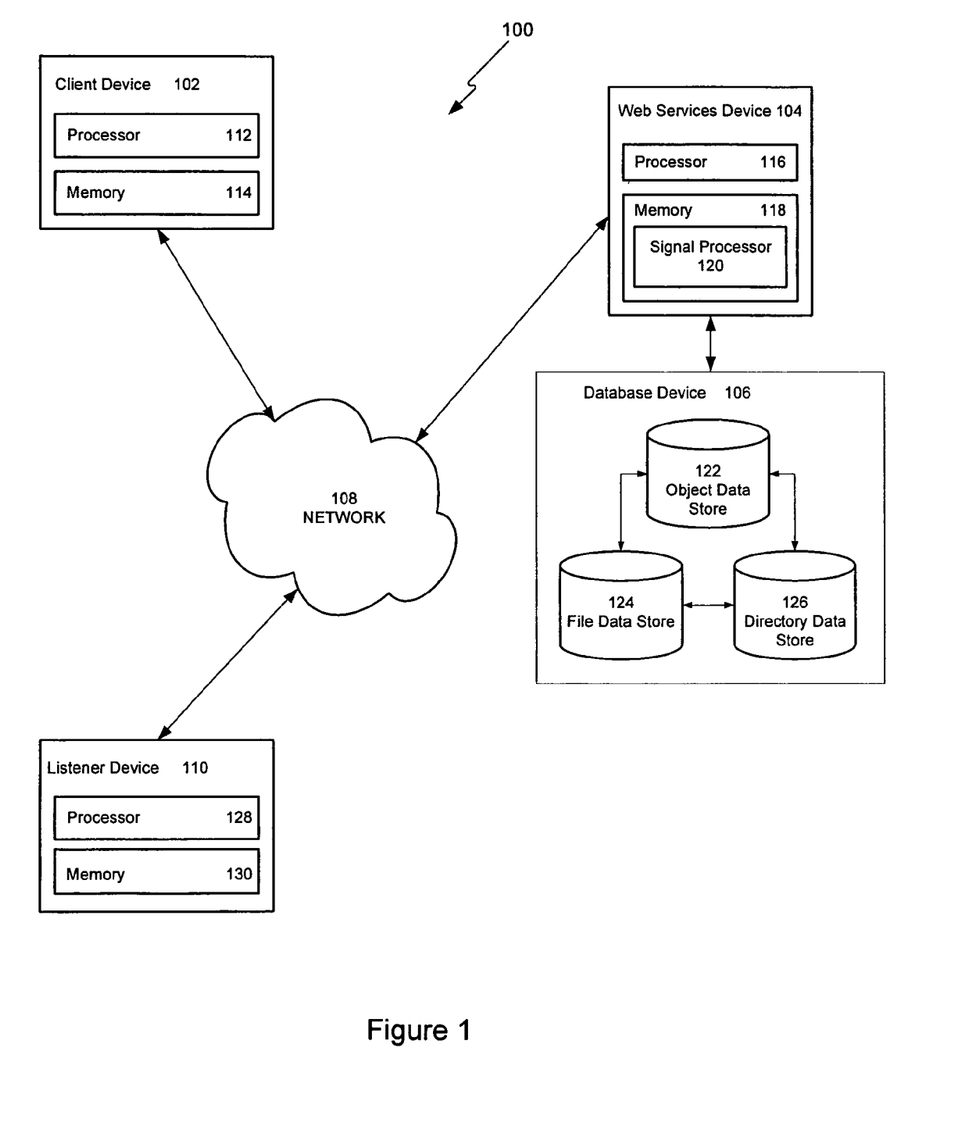
FIG. 1 is a block diagram showing an illustrative environment for implementation of one embodiment of the present invention.

Various systems in accordance with the present invention may be constructed. Referring now to the drawings in which like numerals indicate like elements throughout the several figures, FIG. 1 is a block diagram showing an illustrative environment for implementation of one embodiment of the present invention. The system 100 shown in FIG. 1 comprises a client device 102 in communication with a web services device 104 and a listener device 110 over a network 108. In one embodiment, the network 108 shown comprises the Internet. The network 108 may comprise an intranet, a Local Area Network (LAN), a telephone network, or a combination of suitable networks. The client device 102, the web services device 104 and the listener device 110 may connect to network 10 through wired, wireless, or optical connections. The web services device 104 is also in communication with a database 106.

Although FIG. 1 includes only a single client device 102, web services device 104, database 106 and listener device 110, an embodiment of the present invention will typically include a plurality of client devices 102 and may include a plurality of web services devices 104, databases 106 and listener devices 110.

Web services device 104 and listener device 110, which are depicted as single computer systems, may be implemented as a network of computer processors. Examples of web services devices 104 and listener devices 108 are a server, mainframe computer, networked computer, or other processor-based devices, and similar types of systems and devices.

Client device processor 112, web services device processor 116, and listener device processor 128 can be any of a number of computer processors, as described below, such as processors from Intel Corporation of Santa Clara, Calif. and Motorola Corporation of Schaumburg, Ill.

Such processors may include a microprocessor, an ASIC, and state machines. Such processors include, or may be in communication with computer-readable media, which stores program code or instructions that, when executed by the processor, cause the processor to perform actions. Embodiments of computer-readable media include, but are not limited to, an electronic, optical, magnetic, or other storage or transmission device capable of providing a processor, such as the processor 112 of client device 102, with computer-readable instructions. Other examples of suitable media include, but are not limited to, a floppy disk, CD-ROM, DVD, magnetic disk, memory chip, ROM, RAM, an ASIC, a configured processor, optical media, magnetic tape media, or any other suitable medium from which a computer processor can read instructions. Also, various other forms of computer-readable media may transmit or carry program code or instructions to a computer, including a router, private or public network, or other transmission device or channel, both wired and wireless. The instructions may comprise program code from any computer-programming language, including, for example, C, C++, C#, Visual Basic, Java, Python, Perl, and JavaScript.

It should be noted that the present invention may comprise systems having a different architecture than that which is shown in FIG. 1. For example, in some systems according to the present invention, database device 106 may be contained in memory 118. The system 100 shown in FIG. 1 is merely illustrative, and is used to help explain the illustrative systems and processes discussed below.

Client Devices

In some embodiments, a user may interact with client device 102 to create, access or manipulate files, such as creating video files or updating spreadsheet files. The user may be able to store files locally on the client device 102. To access files remotely stored, the client device may be connected to a network. In some embodiments, the client device is not always connected to a network.

Examples of client device 102 include, without limitation, personal computers, digital assistants, personal digital assistants, cellular phones, mobile phones, smart phones, digital tablets, laptop computers, Internet appliances, and other processor-based devices. In general, a client device 102 may be any suitable type of processor-based platform that is connected to the network 108, and that interacts with one or more application programs.

The client device 102 can contain a processor 112 coupled to a computer readable medium, such as memory 114. Client device 102 may operate on any operating system capable of supporting a browser or browser-enabled application, such as Microsoft® Windows® or Linux. The client device 102 is, for example, a personal computer executing a browser application program such as Microsoft Corporation's Internet Explorer™, Netscape Communication Corporation's Netscape Navigator™, Mozilla Organization's Firefox, Apple Computer, Inc.'s Safari™, Opera Software's Opera Web Browser, and the open source Linux Browser.

The client device 102 may have the functionality to perform various actions on files stored locally and remotely. In some embodiments, such functions include storing files remotely, sharing files, renaming files, duplicating files, and deleting files. The client device 102 may also have the functionality to perform various actions on directories. Such functions may include creating directories, sharing directories, duplicating directories, and deleting directories. Embodiments of the functionality of the client device 102 may be a part of a computer application installed on the client device. In another embodiment, the functionality is part of a browser-enabled application, such as an applet, accessed by the client device through an Internet connection.

In some embodiments of the invention, a client device 102 has the functionality to access a file or directory. For example, the client device 102 may access a file to see how large a file shared by someone else is. In another example, the client device 102 may request to see the contents of a directory. In some embodiments these actions only involve requests to the web services device 104 and the database 106, and do not involve accessing the files remotely stored on the listener device 110.

In some embodiments of the invention, a client device 102 has the functionality to duplicate files and directories. When a client device requests that a file be duplicated, the web services device 104 might create a new file record in the database, duplicating the information from the original file's record. In such an embodiment, the client device's request to duplicate a file does not involve accessing the file on the listener device 110.

In some embodiments of the invention, a client device 102 has the functionality to share files and directories. For example, the client device 102 may request the web services device 104 to make a file available for downloading by a second client device 102. In some embodiments, the client device 102 requests the web services device 104 to share a plurality of files with a plurality of other client devices. For instance, the client device 102 may send a request to the web services device 104 to make a directory of files available to download by a group of other client devices.

In some embodiments of the invention, a client device 102 has the functionality to unshare files or directories. For example, a client device 102 may send a request to a web services device 104 to make a previously available file unavailable for downloading by any other client devices. As another example, a client device 102 may send a request to a web services device 104 to unshare a directory, and make the contents of an entire directory unavailable to certain users.

Web Services Device

In some embodiments of the invention, a web services device 104 facilitates interaction between a client device 102 and a database 106. The web services device may receive requests from client devices to store, manipulate, share, or delete files or directories. Such actions on files and directories can be accomplished by updating records in the database, instead of accessing the files on a remote storage device.

A web services device 104 can contain a processor 116 coupled to a computer readable medium, such as memory 118. The memory comprises applications, such as a signal processor 120. The signal processor 120 can process requests from the client device 102. The signal processor 120 comprises a program code for determining which listener device 110 to access in order to store or retrieve the file. In some embodiments, the signal processor 120 may also comprise a program code for determining whether to manipulate a file record 122 stored on the database 106 or to manipulate a file stored on a listener device 110. Although illustrated as a single processor, the signal processor 120 may comprise a combination of several software programs and/or hardware configurations.

The web services device 104 is in communication with the database 106. In some embodiments, the web services device 104 communicates to the database 106 via a direct wired Ethernet connection. In other embodiments, the web services device 104 communicates to the database 106 via the Internet.

For example, if the client device 102 submits a request to the web services device 104 for information relating to a file stored on the listener device 110, the signal processor 120 may execute a query against tables in the database 106. The signal processor 120 then returns data from the database query to the client device 102.

Database

Database device 106 contains a computer readable medium storage device, such as a magnetic or optical disk storage device, on which are stored tables 122-126. The database device 106 includes a data store management system, such as the Oracle®, SQLServer, or MySQL relational data store management systems, which allows the database device 106 to provide data in response to queries.

In some embodiments of the invention, the database 106 comprises a collection of records associated with a plurality of files. In an embodiment, some database records are pointers to specific locations of files on the listener device 110. In some embodiments, the records in the database 106 are encrypted.

Listener Device

In some embodiments, a listener device 110 may be a server, storing a plurality of user's files in a central location, distinct from the location of client devices 102. Remote storage and access of files on the listener device can be facilitated by a web services device 104 and a database 106. In some embodiments, the contents and structure of a listener device may only be known to a database 106.

The listener device 110 comprises a processor 128 coupled to a computer readable storage device, such as memory 130. In some embodiments, the computer readable storage device can be a magnetic or optical disk.

In some embodiments, the files stored on the memory 130 are compressed and encrypted. The files stored on the memory 130 may also be obfuscated, such that the files are incomprehensible to any device not utilizing the web services device 104 and database device 106.

Illustrative Methods of Remote Storage of Electronic Data

Figure 2:
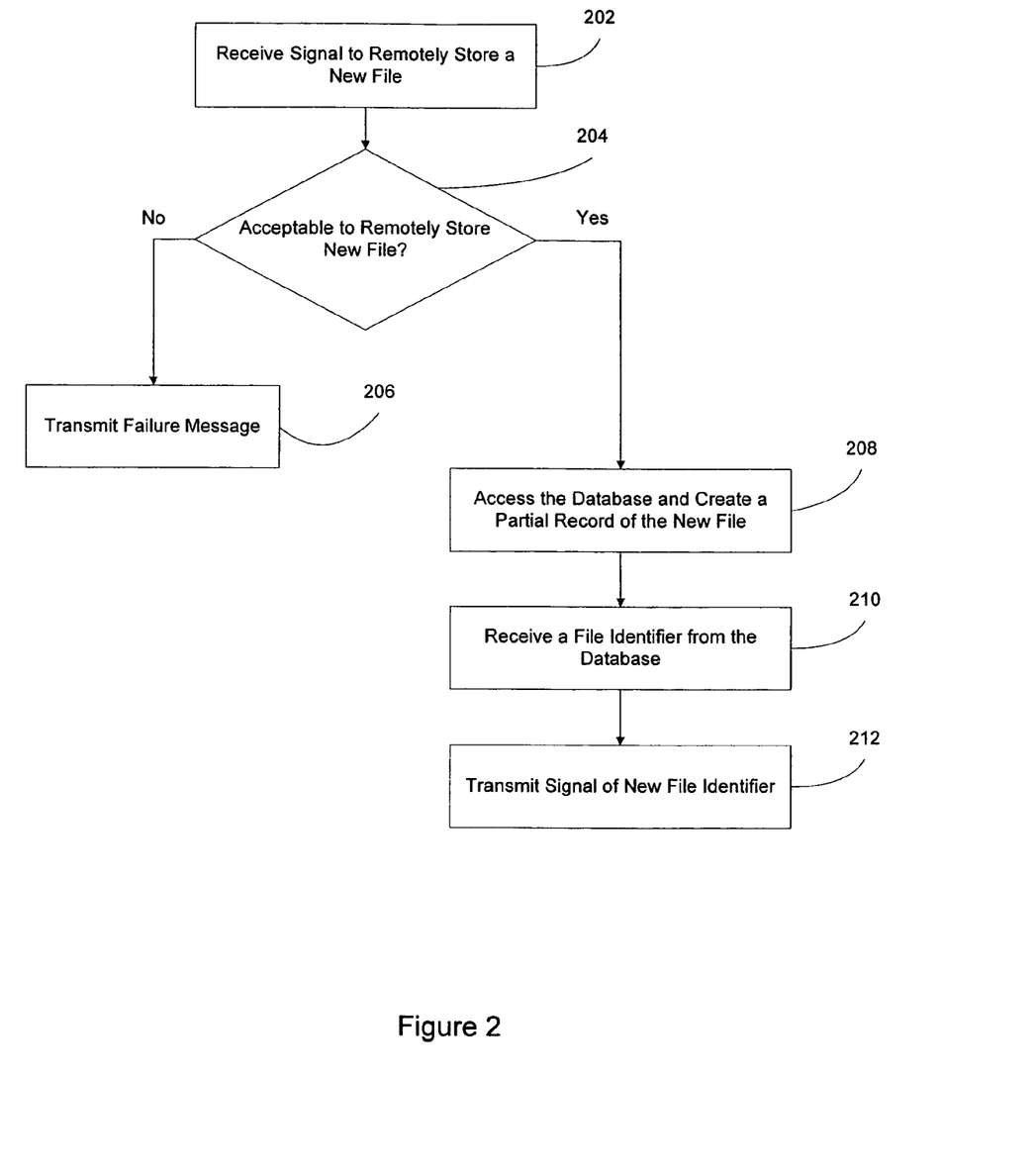
FIG. 2 is a flowchart illustrating a process for receiving a request to remotely store a file in one embodiment of the present invention.

FIG. 2 is a flowchart illustrating a process for receiving a request to remotely store a file in one embodiment of the present invention. In the embodiment shown, the web services device 104 receives a signal to remotely store a file 202. For example, the client device 102 may send a TCP/IP formatted message over the Internet indicating that the client device wants to remotely store a video file. The message may also include information about the file, such as its size and location on the client device.

The web services device 104 then checks to see if the remote storage request is acceptable 204. For example, a remote storage request may be acceptable if the web services device 104 determines the user account has enough allocated free storage to store the file on a listener device 110.

If the remote storage request is not acceptable, the web services device 104 transmits a failure message 206. In one embodiment, the failure message comprises an email sent to a user, requesting the user to take an action to be able to remotely store the file, such as upgrading the user's storage account or deleting files. In another embodiment, the failure message may cause an application on the client device 102 to display an error message.

If the remote storage request is acceptable, the web services device 104 accesses the database 106 and creates a partial record of the file 208. In some embodiments, the record is partial since some information about the file is not available until after it has been remotely stored, such as the specific listener device where the file is located, or which encryption method was used to encrypt the file.

Upon successful completion of the partial record creation, the web services device 104 receives a file identifier 210. In some embodiments, the file identifier is automatically generated by the database 106.

The web services device 104 then transmits the file identifier via a signal 212. Transmission of the signal may comprise transmitting a TCP/IP protocol formatted message to the client device 102 that made the remote storage request.

Figure 3:
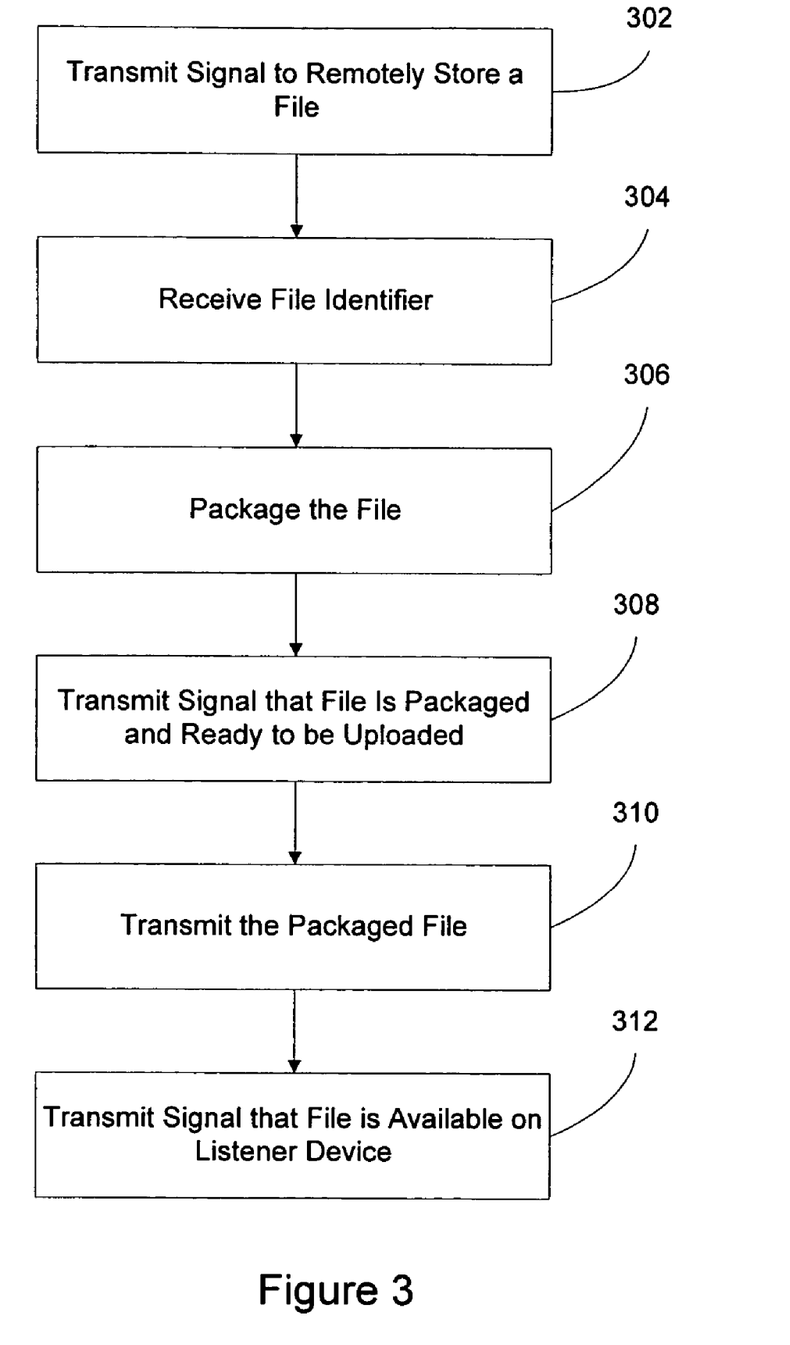
FIG. 3 is a flowchart illustrating a process for transmitting a request to remotely store a file in one embodiment of the present invention.

FIG. 3 is a flowchart illustrating a process for remotely storing a file in one embodiment of the present invention. In some embodiments, the user may generate a request to remotely store a file by dragging a video file from the desktop to a folder in the remote storage application.

In the embodiment shown, the client device 102 sends a signal to remotely store a file 302. The signal may be sent to the web services device 104. In some embodiments, the process of transmitting the signal to remotely store a file 302 is transparent to the user. The signal may contain information about the file to be stored remotely, such as the name of the file, and where it is located on the client device.

The client device 102 then receives a file identifier 304. In some embodiments, this identifier will be sent by the web services device 104, and comprises a record in the database 106 which corresponds with the file to be remotely stored on the listener device 110. The identifier may also comprise an indication that the client device should prepare the file to be remotely stored by packaging it, which may include compressing and encrypting the file.

In the embodiment shown, the client device 102 then packages the file 306. Packaging the file may include compressing and encrypting the file. In some embodiments, the client device 102 creates a temporary file, to contain the newly compressed and encrypted data. For instance, the file may be compressed using a standard ZIP compression, and encrypted using a standard encryption algorithm.

Once the file is packaged, the client device 102 transmits a signal that the file is packaged and ready to be remotely stored 308. This signal may be transmitted to the web services device 104. In some embodiments, this signal may indicate that the file was successfully compressed and encrypted. The signal may also indicate the size of the packaged file.

The client device 102 then transmits the packaged file 310. In an embodiment, the client device 102 transmits the packaged file, which may be compressed and encrypted, to the memory 130 on the listener device 110.

The process of remotely storing a file may be transparent to the user. In one embodiment, the upload process runs as a service. Each time the client device performs a specified file action, such as dragging a file onto an applet, the process executes. In some embodiments, the application gives no indication to the user that any action has been taken until the file has been successfully stored on the remote listener device 110.

The process may also include having the client device 102 connect to a listener device 110 automatically so that the upload process can begin immediately after the file is ready to be uploaded.

Figure 4:
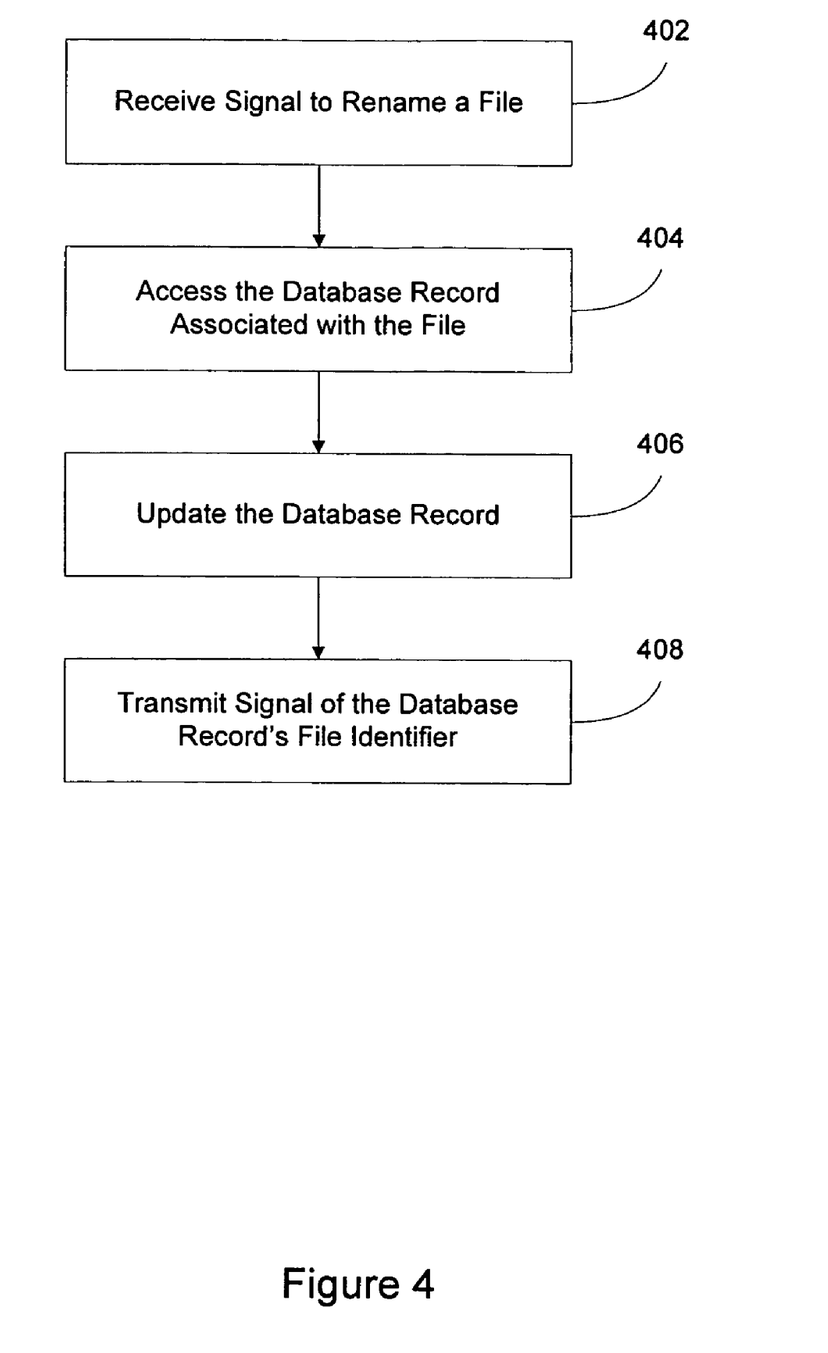
FIG. 4 is a flowchart illustrating a process for receiving a request to rename a file in one embodiment of the present invention.

FIG. 4 is a flowchart illustrating a process for renaming a file in one embodiment of the present invention. In the embodiment shown, a web services device 104 receives a signal to rename a file 402. The signal to rename the file may be sent from a client device 102.

Next, the web services device 104 accesses a record on a database 106 associated with the file 404. The web services device 104 determines that the record in the database 106 needs to be updated, and the remotely stored file does not need to be accessed on the listener device 110. In some embodiments, the actions indicated in the signal may cause the web services device 104 to access the record in the database 106 and access the file stored on the listener device 110. In other embodiments, the actions indicated in the signal may cause the web services device 104 to access the record in the database 106 in order to determine which listener device 110 the remotely stored file is on.

Then, the web services device 104 updates the database record 406. In some embodiments, the web services device 104 updates the database record with the file name included in the signal transmitted to the web services device.

Next, the web services device 104 transmits a signal of the file identifier of the database record 408. For instance, the file identifier may be transmitted to the client device 102 indicating that the file rename was successful.

Figure 5:
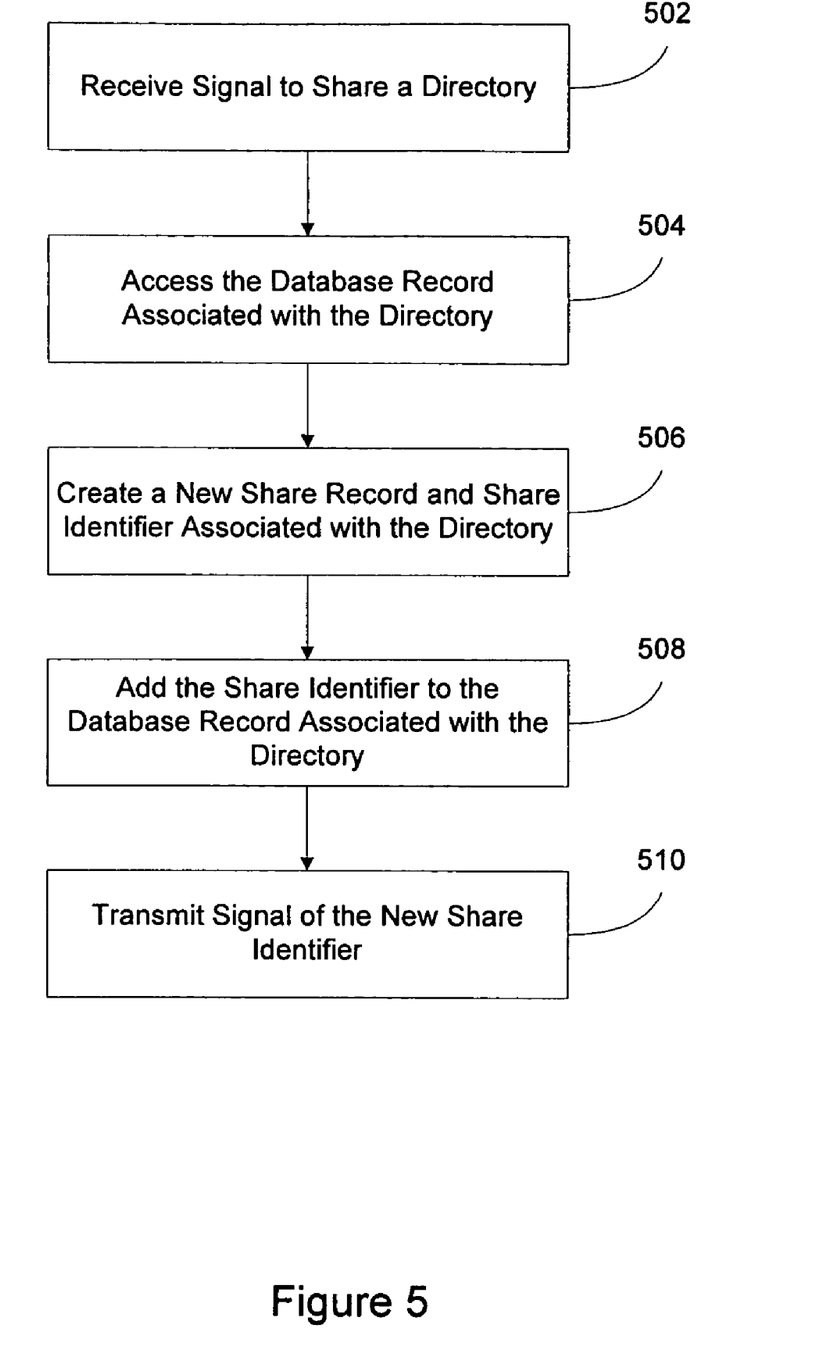
FIG. 5 is a flowchart illustrating a process for receiving a request to share a directory in one embodiment of the present invention.

FIG. 5 is a flowchart illustrating a process for receiving a request for a directory to be shared in one embodiment of the present invention. In the embodiment shown, a web services device 104 receives a signal to share a directory 502. The signal to share the directory may be sent from a client device 102.

Next, the web services device 104 accesses the database record associated with the directory 504. The database record associated with the directory may also be associated with files in the directory, or with pre-existing share records for the directory or files in the directory.

Then, the web services device 104 creates a new share record and share identifier 506. For instance, the share record may include information such as who can access the file, and what privileges different users have for accessing the file.

Then, the web services device 104 adds the share identifier to the database record associated with the directory 508. A directory record may be associated with one or more share identifiers.

Next, the web services device 104 transmits a signal of the new share identifier 510. In some embodiments, this signal is transmitted as an email to a client device 102, with the message informing the client of the newly shared directory.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method for remote data storage, the method comprising:
   receiving a first request at a web services server from a client device processor, the first request comprising information associated with a first packaged file and an action;
   accessing a first record in a database in communication with the web services server based at least in part on the first request, the database comprising a plurality of records having packaged file information associated with each of a plurality of files stored on a listener, wherein the first record is associated with the first packaged file and comprising first file information associated with the first packaged file;
   determining whether to manipulate the first packaged file information in the first record in the database or to transmit the first packaged file information from the first record to the client device processor based at least in part on the request; and
   if the determination is to manipulate the first packaged file information in the first record,
      manipulating the first packaged file information in the first record based at least in part on the first request; otherwise
      transmitting the first packaged file information from the first record to the client device processor,
      receiving a second request at a listener from the client device processor, the second request based at least in part on the first packaged file information and comprising at least some of the first packaged file information and the action, and
      performing the action at the listener.

2. The method of claim 1, wherein the first request is received over the Internet.

3. The method of claim 1, wherein the action comprises one of modifying the first packaged file information, moving the first packaged file, storing the first packaged file, retrieving the first packaged file, sharing the first packaged file, or deleting the first packaged file.

4. The method of claim 1, wherein the first packaged file information comprises a file name, a file location, and a file size.

5. The method of claim 1, wherein the first packaged file comprises a plurality of files.

6. The method of claim 1, wherein the database is encrypted.

7. The method of claim 1, wherein the listener comprises a plurality of servers, the first packaged file is divided into a plurality of first file portions, and wherein each file portion is stored across the plurality of servers.

8. The method of claim 1, wherein the first packaged file is compressed or encrypted.

9. The method of claim 1, wherein the first packaged file stored on at least one processor is obfuscated.

10. The method of claim 1, wherein determining whether to manipulate the first record in the database or to transmit the first packaged file information from the first record to the client device processor based at least in part on the request comprises determining whether the action comprises a manipulation of the first packaged file information or a manipulation of the first packaged file.

11. A system, comprising:
   a database comprising a plurality of records having packaged file information associated with each of a plurality of packaged files, and having a first record associated with a first packaged file, the first record comprising first packaged file information associated with the first packaged file;
   a web services server in communication with the database and a client device processor, the first server configured to:
      receive a first request associated with the first packaged file, the first request comprising information associated with the first packaged file and an action;
      determine whether to manipulate the first packaged file information in the first record or to transmit the first packaged file information from the first record to the client device processor based at least in part on the first request, and
      if the determination is to manipulate the first packaged file information in the first record,
         manipulate the first packaged file information in the first record, and otherwise,
         transmit the first packaged file information from the first record to the client device processor; and
   a listener storing the plurality of packaged files in communication with the client device processor, the listener configured to:
      receive a second request associated with the first packaged file from the client device processor, the second request comprising at least some of the packaged file information and the action;
      perform the action on the first packaged file.

12. The system of claim 11, wherein the first packaged file information comprises a file name, a file location, and a file size.

13. The system of claim 11, wherein the listener comprises a plurality of servers in communication with a request server.

14. The system of claim 11, wherein the action comprises one of modifying the first packaged file information, moving the first packaged file, storing the first packaged file, retrieving the first packaged file, sharing the first packaged file, or deleting the first packaged file.

15. The system of claim 11, wherein the first packaged file comprises a directory.

* * * * *